(12) United States Patent
Thompson et al.

(10) Patent No.: US 6,898,787 B2
(45) Date of Patent: May 24, 2005

(54) METHOD AND APPARATUS FOR ORDERED PREDICATE PHI IN STATIC SINGLE ASSIGNMENT FORM

(75) Inventors: Carol Linda Thompson, San Jose, CA (US); Vatsa Santhanam, Campbell, CA (US); Dz-Ching Ju, Sunnyvale, CA (US); Vasanth Bala, Sudbury, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 633 days.

(21) Appl. No.: 09/814,511

(22) Filed: Mar. 22, 2001

(65) Prior Publication Data

US 2004/0015919 A1 Jan. 22, 2004

(Under 37 CFR 1.47)

(51) Int. Cl.[7] .................................................. G06F 9/45
(52) U.S. Cl. ...................... 717/152; 717/141; 717/142; 717/158; 717/159
(58) Field of Search ................................. 717/141–167

(56) References Cited

U.S. PATENT DOCUMENTS

| | | | | |
|---|---|---|---|---|
| 5,448,737 A | * | 9/1995 | Burke et al. ................. | 717/146 |
| 6,035,124 A | * | 3/2000 | Ng ............................. | 717/146 |
| 6,182,284 B1 | * | 1/2001 | Sreedhar et al. ............ | 717/146 |
| 6,651,247 B1 | * | 11/2003 | Srinivasan ................... | 717/161 |

OTHER PUBLICATIONS

Balance, R., A. Maccabe, and K. Ottenstein; *The Program Dependence Web: A Representation Supporting Control-, Data-, and Demand-Driven Interpretation of Imperative Languages;* 1990; ACM.

Cytron, R., J. Ferrante, B. Rosen, and M. Wegman; *Efficiently Computing Static Single Assignment Form and the Control Dependence Graph;* 1991; ACM Transactions on Programming, vol. 13, No. 4.

Park, J. and M. Schlansker; *On Predicated Execution;* 1991; Hewlett Packard Company.

Ramakrishna Rau, R., D. Yen, W. Yen, and R. Towle; *The Cydra 5 Departmental Supercomputer;* 1989; IEEE.

* cited by examiner

Primary Examiner—Tuan Dam
Assistant Examiner—Chuck Kendall

(57) ABSTRACT

A $\Phi$ function provides a mechanism for static single assignment in the presence of predicated code. Guards placed on each source operand of the $\Phi$ function indicate the condition under which the corresponding source operand is live and provide correct materialization of the $\Phi$ functions after code reordering. For control functions $\Phi_c$ representing a confluence of live reaching definitions at a join point in the control flow graph, the guards indicate the basic block which is the source of the edge associated with the source operand. The $\Phi_c$ operands are paired with the source basic block of the incoming edge(s) along which they are live. The operands are also ordered according to a topological ordering of their associated block. This ordering is maintained through subsequent code transformations. In the topological ordering, the source of the edge from which the definition was passed is defined. A predicate $\Phi$ function $\Phi_p$, represents the confluence of definitions in a straight line of code in which some of the definitions have been predicated. For $\Phi_p$, the guards on the source operands indicate the predicate under which the corresponding operand is live. The order of the operands is such that the $\Phi_p$ function can be fully materialized by inserting a copy from each source operand to the target variable, in the corresponding order, and each predicated by the associated predicate guard.

15 Claims, 6 Drawing Sheets

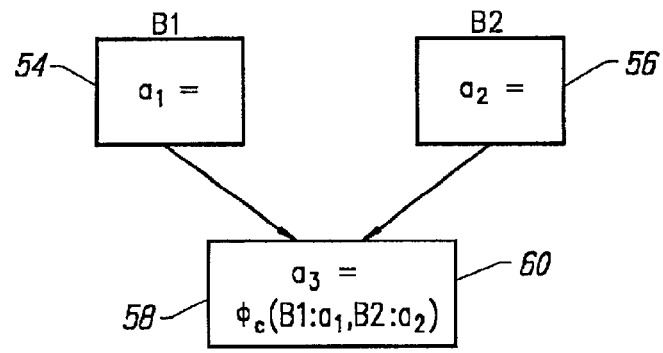
*FIG. 4a*
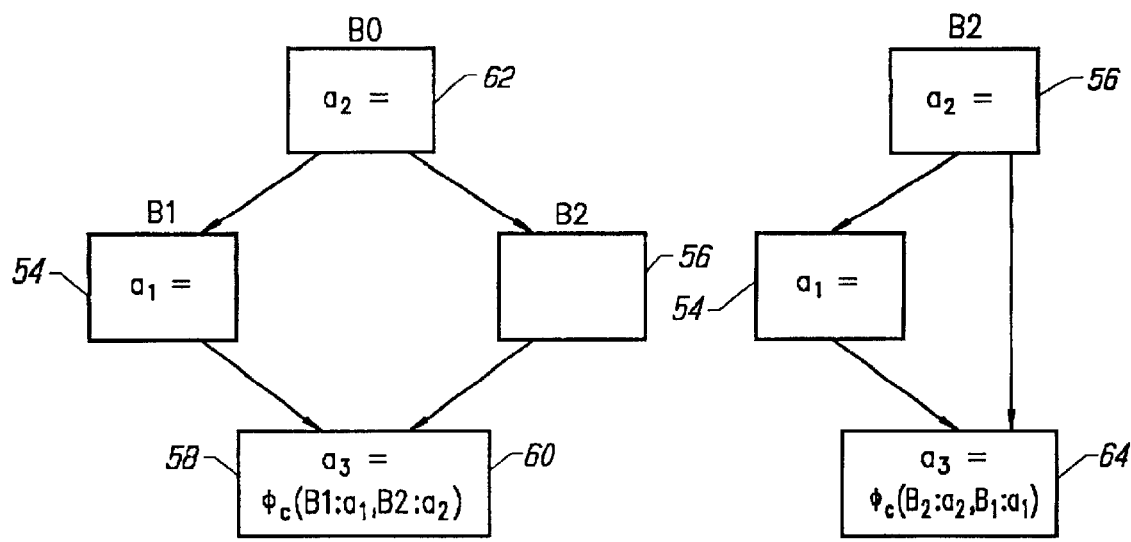
*FIG. 4b*  *FIG. 4c*

66 — if p1  $a_1 = x$
68 — if p2  $a_2 = y$
78 — $a_3 = \phi_p(p1:a_1, p2:a_2)$

80 — p1,p2 = cmp ( )
82 — if p1  $a_1 = x$
84 — if p1  $a_2 = y$
86 — $a_3 = \phi_p(p1:a_1, p2:a_2)$

METHOD AND APPARATUS FOR ORDERED PREDICATE PHI IN STATIC SINGLE ASSIGNMENT FORM

BACKGROUND OF THE INVENTION

1. Technical Field

The invention relates to computer program transformation techniques. More particularly, the invention relates to a $\Phi$ function which may be used when constructing static single assignment forms in the presence of predication.

2. Description of the Prior Art

Computer program transformation techniques include algorithms that are used to transform a sequence of instructions, such that the result of their execution is unchanged. The purpose of a series of transformations is to produce an optimized program which is either shorter in number of instructions or execution time, or that enables further transformations which may themselves produce a shorter execution time.

Many recently developed program transformation techniques are based on a program representation called static single assignment (SSA) form. An SSA form is a program representation which obeys the property that each variable (or resource) name is defined statically exactly once. A resource is a program variable. It may be a register resource such as a general purpose register, or it may be a memory location. Thus, there is a single definition which may, during program execution, be executed multiple times. For example, the single definition a=x may be executed multiple times during a program run, with different values for x during each execution.

A definition of a resource is considered to be a reaching definition at a point "P" in a program if there is a path from the definition to "P" along which the resource has not been redefined. At program locations where there are multiple reaching definitions of a variable, a special $\Phi$ function is inserted. FIGS. (1a) an (1b) are control flow graphs showing multiple reaching definitions of a variable, according to the prior art.

In FIG. 1a, a path through edge 10 on which the block 12 contains a=x joins with a path through edge 14 on which the block 16 contains a=y at join point 18. Thus, at this join point, either values "x" or "y" could be obtained for "a." FIG. 1b is an SSA representation of the FIG. 1a control flow graph. In FIG. 1b, the block 12 containing variable $a_1$=x is on path 10, while the block 16 containing variable $a_2$=y is on path 14. At the join point 18, the variable $a_3$=$\Phi$ (a1, a2). The $\Phi$ function is a notational convenience indicating that there is some function whose value is dependent upon which path is taken. This $\Phi$ function is, therefore, a non-executable instruction which expresses the confluence, at a join point in a program control flow graph, of multiple reaching definitions. Such $\Phi$ function generates a single definition of a new variable.

It is necessary to exit an SSA form to generate code that is executable by a machine (computer). In general, when an SSA form is exited, and final code generation is performed, some $\Phi$ functions may need to be materialized (i.e. copies introduced on the incoming control paths) to preserve correctness. When a form is exited to perform allocation of registers, variables $a_1$, $a_2$, and $a_3$ may be merged to a single register, (see FIG. 1a). In order to correclty perform register allocation, all variables participating as operands or target of the same phi function must reside in the same register.

FIGS. 2a and 2b are control flow diagrams illustrating materialization of variables, according to the prior art. In this example, on a first path through edge 26, $a_1$=x in block 32, and on a second path through edge 28, $a_2$=y in block 34. At the join point 36, $a_3$=$\Phi$($a_1$, $a_2$).

If edge 28 is taken, $a_2$ is clearly defined. However, if edges 30 and then 26 are taken, $a_2$ has been defined, but so has $a_1$. If all the variables are located in the same register, then $a_1$ has overwritten $a_2$ and it is no longer available. In this case, the only way to preserve the correctness of the assignment to z is to materialize the variables.

FIG. 2b is a control flow diagram illustrating the materialization of the variables in FIG. 2a. After the assignment to $a_2$ variable "t" is assigned value $a_2$ in block 34. The value of $a_2$ is now saved. At the point where x is assigned to $a_1$, "t" has not been overwritten, even if variables $a_1$, $a_2$, and $a_3$ have all been assigned to the same register. At the join point, "t" is used to assign to z in block 36 instead of $a_2$. Once this transformation has been made, it is correct to assign variables $a_1$, $a_2$, and $a_3$ to the same register. This is called materializing the $\Phi$ function.

A technique known as predicated execution is described in Rau, B. R., Yen, D. W. L., Yen, W., and Towle, R. A., "The Cydra 5 Departmental Super-computer, Design Philosophies, Decisions, and Trade-Offs." IEEE Computer, January 1989, pp. 12–35; and Park, J. C. H., and Schlansker, M., "On Predicated Execution," Hewlett-Packard Laboratories Technical Report HPL-91-58, May, 1991. A predicate is a Boolean value, such as "True" or "False." In predicated execution, predicates are used to guard the execution of instructions. Under predicated execution, each instruction has an associated predicate which, if true, then the instruction is actually executed and which, if false, then the instruction is effectively non-operational. With the introduction of predicated execution, the confluence of definitions is no longer confined to join points in the control flow graph.

Constructing an SSA form while using predication execution presents several new challenges:

- The $\Phi$ functions may occur at any point, even in branch-free code sequences.
- When interferences are introduced between the $\Phi$ target and its sources, they cannot be resolved simply by placing copy instructions on the incoming edges at the join point.
- $\Phi$ materialization is complicated by the fact that multiple variables related by a single phi may be live concurrently (though under different predicates).

FIG. 3 is a control flow graph illustrating predicated execution according to the prior art. In the figure, $a_1$ is assigned x in block 44, and $a_2$ is assigned y in block 46. Block 38 contains the compare which determines whether block 44 or 46 is executed. Thus, if the result of the compare is "true," block 44 is executed and if "false," block 46 is executed. At the join point at block 48, $a_3$=$\Phi$($a_1$,$a_2$)

When this code is transformed to predicated execution, predicates $p_1$ and $p_2$ are assigned to represent the "true" and "false" of the compare operation. If b and c are equal, $p_1$ is true and $p_2$ is false. If b and c are not equal $p_1$ is false and $p_2$ is true. These values of $p_1$ and $p_2$ are known as predicate guards.

The branched control flow graph can now be constructed as a straight line sequence of codes (block 50). Therefore, if $p_1$ is true, $a_2$=y and if $p_2$ is true, $a_1$=x. In this example, $a_3$=$\Phi$($a_1$, $a_2$). This $\Phi$ is not occurring at a confluence at a joint point in the graph, but just in a straight line stream of instructions. Therefore, $a_3$ equals either $a_1$ or $a_2$, depending on the value of these predicates. If $z=a_2$ at some later point in the code, the value of $a_2$ must be retained. However, if all of the variables are assigned to the same register, the value of $a_2$ cannot be retained by materialization.

During code transformations, such interferences may be introduced between the $\Phi$ target and its sources. These interferences cannot be resolved simply by placing copy instructions on the incoming edges at the join point such as the example of setting $t=a_2$ 40 in FIG. 2b. This is because the copy instructions would effectively be on all paths.

A variable is live when it has been defined and its last use has not yet been reached. Because the variable's value is defined and is to be consumed at a later point in the instruction stream, its value must be preserved. In FIG. 3, there are multiple variables related by a single $\Phi$ and which are live concurrently. After predicated execution has been performed, the line of code $z=a_2$ is moved below the point of the assignment to $a_3$ at instruction 52.

The variable $a_3$ is live at instruction 52 because, presumably, at some point the value of $a_3$ is to be consumed. However, when $p_1$ is "true," the variable $a_2$ is assigned the value y. Therefore, $a_2$ is also live and both of these live values interfere because multiple live participants in a $\Phi$ cannot be assigned to the same register or variable location.

The original SSA formulation, described in Cytron, R., Ferrante, J., Rosen, B., Wegman, M., and Zadeck, K., "Efficiently Computing Static Single Assignment Form and Control Dependence Graph," ACM Transactions on Programming Languages and Systems, 13(4):452490, October, 1991; and Choi, J., Cytron, R., Ferrante, J., "System and Method for Solving Monotone Information Propagation Problems," U.S. Pat. No. 5,327,561 (July 1994), awarded to International Business Machines Corporation of Armonk, N.Y., did not address problems arising from the use of predicated execution.

A gated form of SSA, Gated Single Assignment (GSA) was proposed in Ballance, R., Maccabe, A., and Ottenstein, K., "The program dependence web: a representation supporting control-, data-, and demand-driven interpretation of imperative languages," Proceedings of the SIGPLAN '90 Conference on Programming Language Design and Implementation, pp. 257–271, June 1990. The GSA approach is directed to interpreting, rather than translating a program from the source language to a machine language. Interpreting refers to performing the translation on the fly as the program is executed. An interpreter looks at a statement in a source language and directly executes it. An interpreter is essentially a phase of a virtual machine that implements the language in which the source programmer code is written. This is significantly different from translating a program from source language to machine language, and then executing the program.

In GSA, control dependence information is associated with each reaching definition at a $\Phi$ function (termed g functions in this formulation). One difference between GSA and SSA is the introduction of gates, which are conditions that guard the operands to $\Phi$. A guard indicates when the operand would be selected.

However, this formulation again relies upon the association of the $\Phi$ node with the join point in the control flow graph, and expresses the full control dependence of each incoming edge at the join point, to wit, the entire chain of control decisions that would have had to be made for that path to have been selected. Thus, GSA does not address the problems of $\Phi$ materialization or predicated code. Finally, the Ballance, et al. formulation is limited to the evaluation of a single condition to select between only two possible values, and therefore does not handle the confluence of more than two paths.

It would therefore be an advantage to provide a method and apparatus that permits SSA-based transformation techniques to be applied to predicated code. It would be a further advantage if such method and apparatus permitted the use of more than two operands for a key function and addressed the problem of materialization and did not require a $\Phi$ function to be at a join point in a control flow graph.

SUMMARY OF THE INVENTION

The invention relates to a method and apparatus for a $\Phi$ function which provides a mechanism for single static assignment in the presence of predicated code in a computer program. Predicate guards are placed on each source operand to indicate the condition under which the corresponding source operand is live and to provide correct materialization of the $\Phi$ functions after code reordering.

A prior art $\Phi$ function, referred to as a control function ($\Phi_c$), represents a confluence of live reaching definitions at a join point in the control flow graph. For a $\Phi_c$, guards provided on the source operands indicate the basic block which is the source of the edge associated with the source operand.

The invention pairs the $\Phi_c$ operands with the source basic block of the incoming edge(s) along which they are live. In addition, in the invention, the operands are ordered according to a topological ordering of their associated block. This ordering is maintained in a valid topological ordering through any subsequent code transformations. In the topological ordering, the source of the edge from which the definition was passed is defined.

A predicate $\Phi$ function, $\Phi_p$, according to the invention, provides a mechanism for SSA in the presence of predicated code and permits correct materialization of the $\Phi$ functions after code reordering. For $\Phi_p$, the guards on the source operands indicate the predicate under which the corresponding operand is defined. The $\Phi_p$ represents the confluence of definitions in a straight line of code in which some of the definitions have been predicated.

The order of the operands, and their associated guards, allows for the case where the operands are not defined under disjoint predicates. The order is such that the $\Phi_p$ function can be fully materialized by inserting a copy from each source operand to the target variable, in the corresponding order, and each predicated by the associated predicate guard.

BRIEF DESCRIPTION OF THE DRAWINGS

FIG. 4a is a control flow graph showing a first topological ordering according to the invention;

FIG. 4b is a control flow graph showing a second topological ordering according to the invention;

FIG. 4c is a control flow graph showing a third topological ordering according to the invention;

DETAILED DESCRIPTION OF THE INVENTION

Figure 1A:
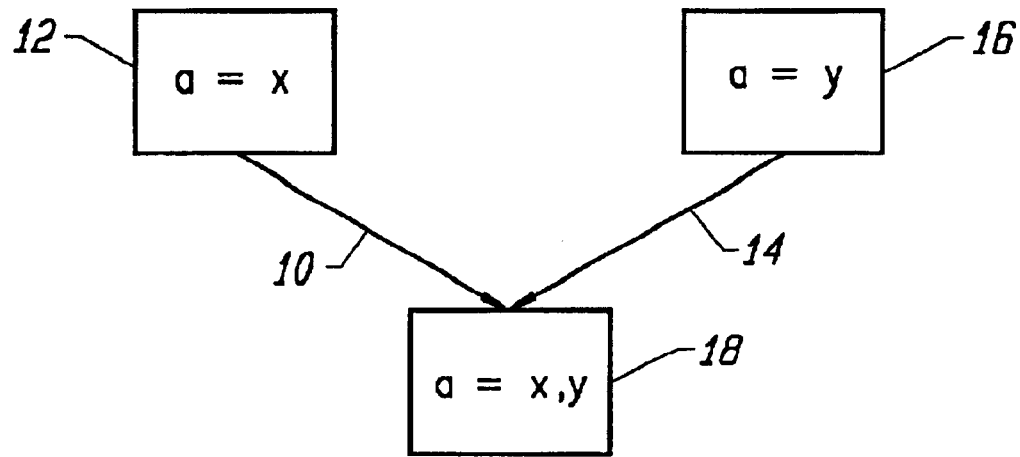
FIGS. 1a and 1b are control flow graphs showing multiple reaching definitions of a variable according to the prior art.
Figure 1B:
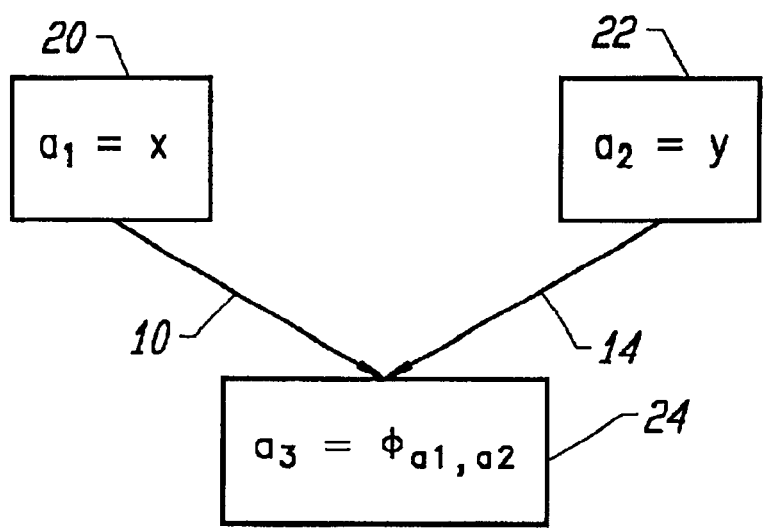
Figure 2A:
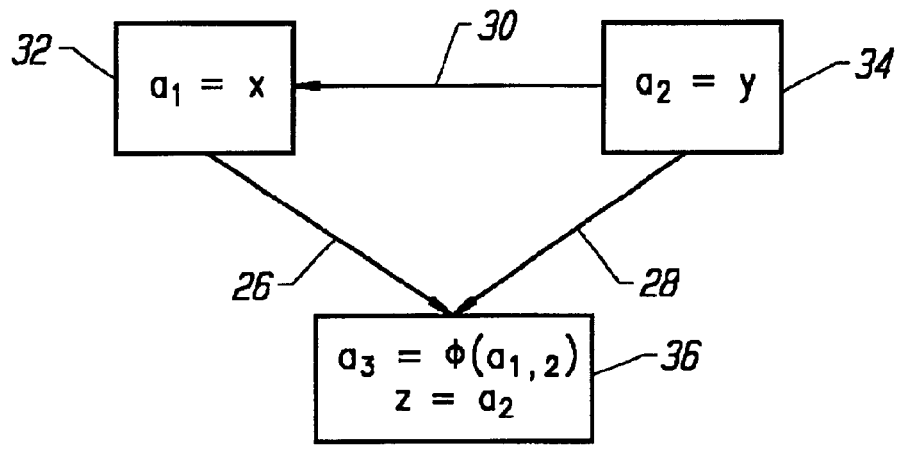
FIGS. 2a and 2b are control flow diagrams illustrating materialization of variables according to the prior art.
Figure 2B:
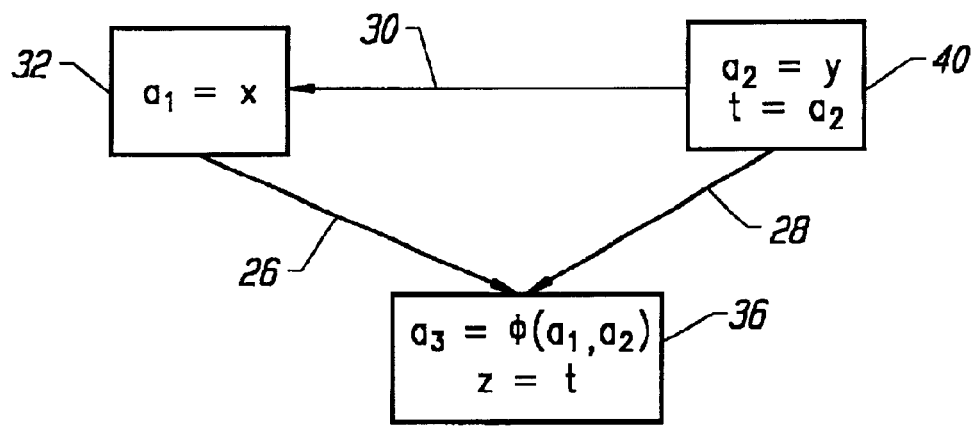
Figure 3:
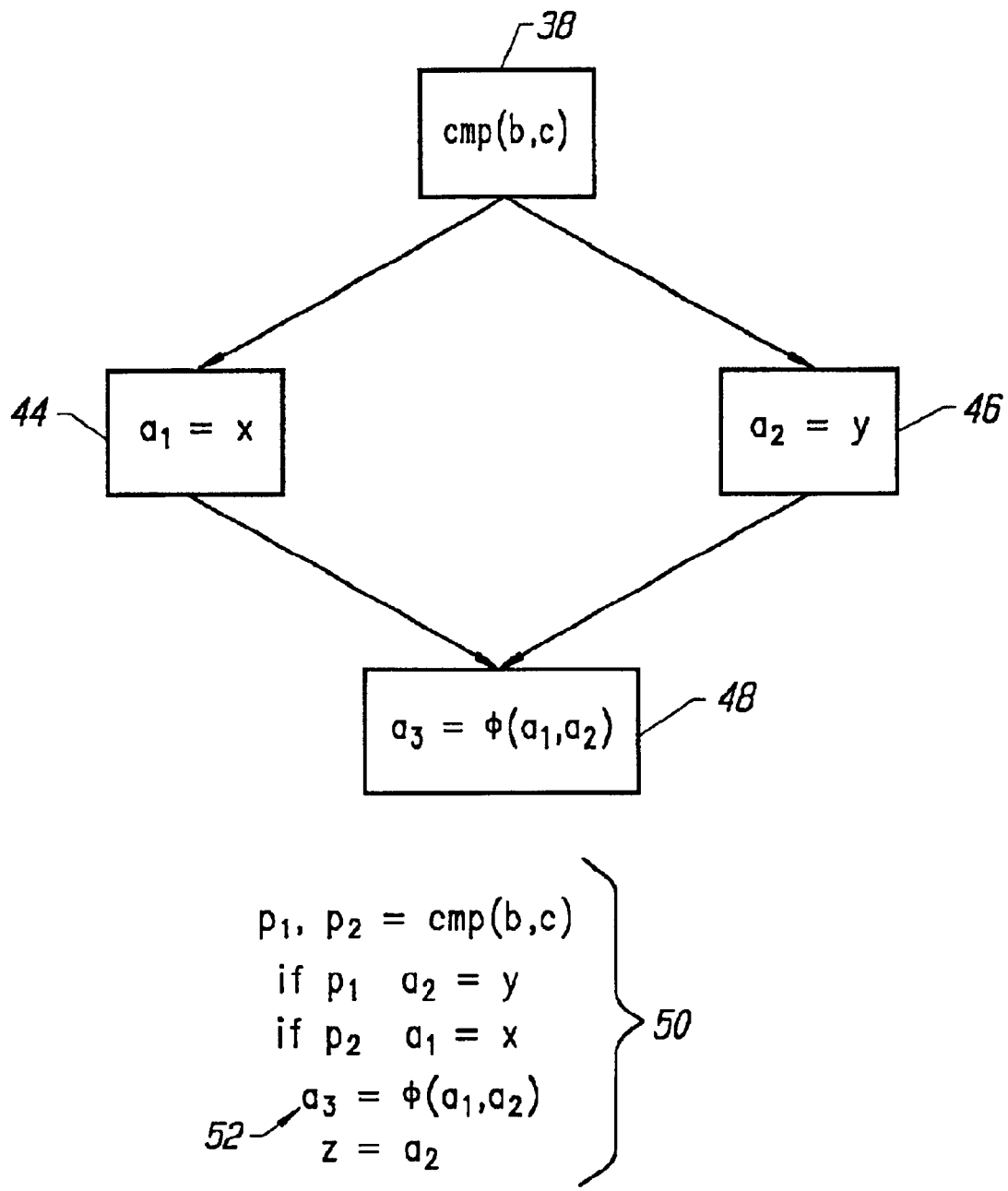
FIG. 3 is a control flow graph illustrating predicated execution according to the prior art.

The invention is a special form of the $\Phi$ function which provides a mechanism for static single assignment in the presence of predicated code and introduces predicate guards on each source operand of a $\Phi$ function in a computer program. Such predicate guards indicate the condition under which the corresponding source operand is live and provide correct materialization of the $\Phi$ functions after code reordering. Previous SSA formulations have not addressed the problems introduced by predication. Without this mechanism, it would be necessary to restrict code reordering significantly to preserve correctness.

For control $\Phi$ functions $\Phi_c$, the guards on the source operands indicate the basic block which is the source of the edge associated with the source operand. For the purposes of this application, a control function is the $\Phi$ function known under the prior art, enhanced with the basic block guards. A control function represents a confluence of live reaching definitions at a join point in the control flow graph.

For unpredicated computer program code, the construction of $\Phi_c$ functions is done in a manner similar to the SSA formulation proposed by Cytron et al. However, the invention pairs the $\Phi_c$ operands with the source basic block of the incoming edge(s) along which they are live. In addition, in the invention, the operands are ordered according to a topological ordering of their associated block. This ordering must subsequently be maintained in a valid topological ordering through any subsequent code transformations.

FIG. 4a is a control flow graph showing a first topological ordering according to the invention. In the figure, the first block B1 (designated as block 54), and the second block B2 (designated as block 56) reach a confluence at block 58. At block 58, $a_3=\Phi_c(B_1:a_1, B_2:a_2)$ (See block 60). This indicates that $a_1$ is the source operand that comes from B1 and $a_2$ is the source operand that comes from B2. In the prior art, the $\Phi$ function uses only $a_1$ and $a_2$, and not the representations B1 and B2.

A block represented at the join point by the $\Phi_c$ does not have to be the block in which a source operand is defined. FIG. 4b is a control flow graph showing a second topological ordering according to the invention. In FIG. 4b, $a_2$ is defined at an earlier block B0 62. This block is a common predecessor of both B1 and B2. However, the $\Phi_c$ is the same as that of FIG. 4a because B2 is still the block from which the definition was passed to the block 58 at the join point. Thus, only the source of the edge from which the definition was passed must be defined. Because B1 and B2 are topologically at the same level, the argument of $a_3$ may remain the same as that of FIG. 4a.

FIG. 4c is a control flow graph showing a third topological ordering according to the invention. In FIG. 4c, B2 is the source of the operand definition and is also a predecessor of B1. Because B2 is topologically before B1, it is listed first in the argument of $a_3$ 64.

The compiler determines the topology of the blocks of code at the time that the control flow graph is built. The compiler takes a stream of code, identifies where the blocks and edges are and performs a topological numbering of the blocks. Each block is assigned a number with a lower number indicating that a block is topologically first. Such compiler can be readily assembled by one skilled in the art using well-known program techniques and equipment.

A predicate $\Phi$ function $\Phi_p$, according to the invention, provides a mechanism for SSA in the presence of predicated code and permits correct materialization of the $\Phi$ functions after code reordering. For $\Phi_p$, the guards on the source operands indicate the predicate under which the corresponding operand is defined. The $\Phi_p$ represents the confluence of definitions in a straight line of code, where some of the definitions have been predicated.

The order of the operands, and their associated guards, allows for the case where the operands are not defined under disjoint predicates. The order is such that the $\Phi_p$ function can be fully materialized by inserting a copy from each source operand to the target variable, in the corresponding order, and each predicated by the associated predicate guard.

Figures 5A, 5B, 5C:
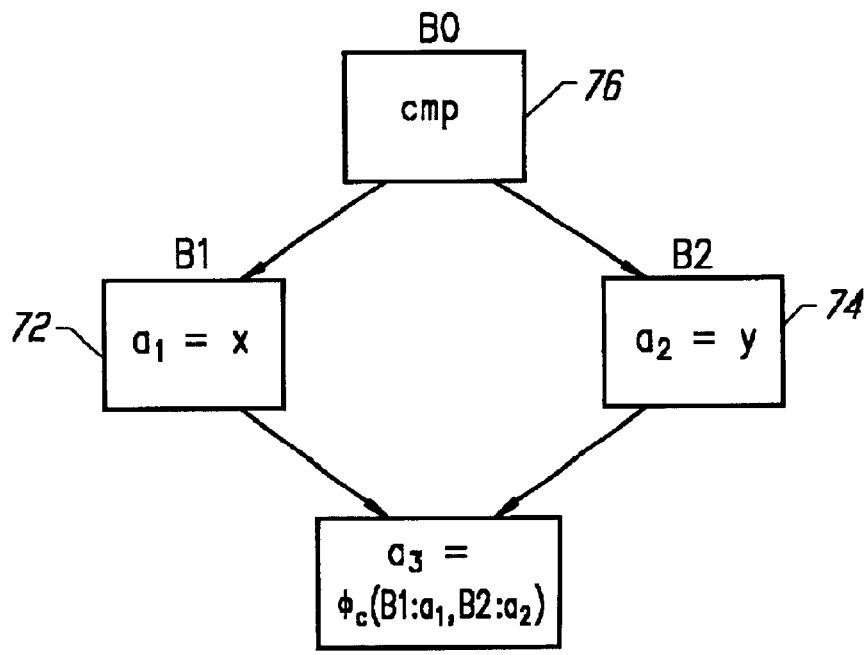
FIG. 5a is a first example of source code according to the invention.
FIG. 5b is a control flow graph of the first example of source code according to the invention.
FIG. 5c is a representation of the predicated code from the first example of source code according to the invention.

FIG. 5a is a first example of source code. In the example, if condition c1 is true, then a is assigned the value x; otherwise, a is assigned the value y.

FIG. 5b is a control flow graph of the first example of source code, according to the invention. The value of a1 is assigned in block B1 (designated as block 72) and the value of a2 is assigned in block B2 (designated as block 74). Block B0 (designated as block 76), topologically above B1 and B2, is a compare operation. The control function represented in block 78 is $a_3=\Phi_c(B1:a_1,B2:a_2)$.

FIG. 5c is a representation of the predicated code from the first example of source code according to the invention. Instead of having the block designation on each operand, the predicated code has a predicate designation on each operand. A compare 80 is used to change the $\Phi_c$ into predicated code. If p1, then $a_1$ gets y (designated as statement 82), if p2 then $a_2$ gets x (designated as statement 84) and $a_3=\Phi_p(p1:a_1, p2:a_2)$ (designated as statement 86). This transfers the $\Phi_c$ into a $\Phi_p$. Thus, for example, the B1 path is now the P1 path.

As another example, consider the following source code:

```
a=1;

if (condition)

a=x;                                              (1)
```

Once predicated, the Boolean result of the compare is written to a predicate, 'p1', used to qualify the code which is to be executed when that condition is TRUE.

The above code is transformed to the following:

```
a=1;

p1=(condition);

p1?a=x;                                           (2)
```

At the end of this sequence, the variable 'a' has two reaching definitions. In SSA form, a $\Phi$ function is required to express the confluence of these definitions:

```
a₀=1;

p1=(condition);

p1?a₁=x;
```

$a_2 = \Phi_p(TRUE:a_O, p1:a_1);$            (3)

The code may be re-ordered as follows, for example, if the assignment of $a_1$ involved a long-latency load of x:

$a_1 = x;$ $a_0 32\ 1;$ $p1 = (condition);$ $a_2 = \Phi_p(TRUE:a_O, p1:a_1);$            (4)

To transform this code out of SSA form correctly, the $\Phi_p$ function is materialized by inserting copies in the order of its operands:

$a_1 = x;$ $a_0 = 1;$ $p1 = (condition);$ $a_2 = a_O;$ $p1?a_2 = a_1;$            (5)

Finally, unnecessary copies are eliminated, producing the following:

$a_1 = x;$ $a_2 = 1;$ $p1 = (condition);$ $p1?a_2 = a_1;$            (6)

The construction of $\Phi_p$ functions is performed in two places. First, during the initial construction of SSA form, predicate $\Phi_p$ functions are inserted after all existing predicated definitions. The pseudo code which accomplishes this is an extension of the algorithm proposed by Cytron et al, and is included in Table 1.

TABLE 1

Pseudo code for constructing predicate $\Phi$ functions

```
search(currentBasicBlock)
{
for each Instruction, thisInst in currentBasicBlock do
    if thisInst is a non-Φ-instruction then do
        rename uses
    for each resource V defined in thisInst do
        U = clone(V)
        Replace V with U as the target being defined
        if thisInst is predicated by P != TRUE then do
            Y = topOfStack(V)
            W = clone(V)
            newInst =" W = Φp(TRUE:Y,P:U)"
            insert newInst after thisInst
            push W onto Stack(V)
        else
            push U onto Stack(V)
        endif
    endfor
endfor
```

As is shown by the pseudo code of Table 1, the compiler searches the current block and goes through each instruction in the source code instructions. For a non-Φ instruction, all of its uses are renamed. Every resource that is actually defined by this instruction needs a new name because there can only be one definition in each variable. Therefore, the variable "V" is cloned to produce a "U."

A cloned resource is a resource resulting from a renaming of another resource. It duplicates all of the properties of the original resource, such as resource type. Thus, if "V" is a general purpose register, "U" is also a general purpose register. If "V" is a stack location then "U" is a new stack location. "V" is then replaced by "U" in that instruction.

If this instruction is predicated by a predicate P which is not a "CONSTANT TRUE," it is in predicated form. By contrast, if the predicate is true, the instruction is not predicated because it is always executed.

For a predicated instruction, a new resource "Y" is created which is a clone of "V." "Y" is then assigned whatever clone of "V" is currently on the top of stack. "V" is then cloned again to produce "W."

"W" is defined as equal to the result of the predicate $\Phi$ where "Y" is the value for "TRUE" and "U" is the value under P for the current predicate. Thus, the incoming value is "Y", but if P is "TRUE" then the value is "U." This follows topological ordering because "TRUE" is always a superset of P.

The construction of $\Phi_p$ functions is also done when control flow is replaced by predication while already in SSA form. At that time, the control $\Phi_c$ functions are either replaced or augmented with predicate $\Phi_p$ functions. The pseudo-code to replace or augment the control $\Phi_c$ functions is shown in Table 2. The pseudo-code takes as input the control $\Phi_c$ function to be transformed. A mapping from predicated basic blocks to their associated predicate, and the set of basic blocks which have been predicated are also taken as input.

TABLE 2

Pseudo Code For Transforming $\Phi_c$ Functions to $\Phi_p$ Functions After Predication

```
transform(Φc Inst, predicateMap, predicatedBlocks)
{
V = target(Φc Inst)
Set S = set of source basic blocks for Φc Inst
// Identify any blocks which were not transformed
Set T = ( S - predicatedBlocks )
if T == S then return
ΦpInst = "V = Φp()"
if size(T) > 1 then
    // need to retain control phi
    W = clone (V)
    target (ΦcInst) = W
    add operand {W, TRUE} to ΦpInst ( as first operand)
else if size(T) = = 1 then
    B = single block in T
    U = source operand associated with B in Φc Inst
    add operand {U, TRUE} to ΦpInst (as first operand)
    delete operand {U,B} from Φc Inst
endif
for each [source operand R, basic block B} of Φc Inst
do
    if B in predicatedBlocks then do
        delete operand {R,B} from Φc Inst
        add operand {R,predicateMap[B]} to ΦpInst (operands are added in order)
    endif
endfor
if ΦcInst has no operands, then delete it
```

In the Table, some blocks are eliminated and completely replaced by predicated instructions in another block. The first argument is the $\Phi_c$ instruction that may or may not be transformed. The predicate map is a mapping from a block to its associated predicate. Predicated blocks are a set of blocks that have been completely predicated.

The source basic blocks "S," which are all the blocks whose edges contribute to the $\Phi$ instruction, are identified, and the difference between "S" and the predicated blocks is placed into "T." Therefore, "T" is now the set of all blocks which have associated operands in the $\Phi_c$, and which have not been eliminated by predication. If "T" and "S" are the same, then all of the blocks involved in the $\Phi_c$ still exist and have not been predicated. In such case, there is a return and nothing is done by the program.

If "T" and "S" are different, a $\Phi_p$ instruction with no operand is generated. If the size of "T" is greater than 1, the $\Phi_c$ is retained. This is because there still exists a control flow join of multiple blocks. The target of the existing $\Phi_c$ instruction is set to "W," and the operand "W, TRUE" is added to the $\Phi_p$ instruction.

If the size of T is equal to 1, then "B" is the single block in that set and "U" is the source operand associated with "B" in the original $\Phi_c$ instruction. In such case, "U" is added as a "TRUE" operand to the $\Phi_p$ and is deleted from the $\Phi_c$. Because "B" is now, being reflected as the first operand of the $\Phi_p$, the $\Phi_c$ can be eliminated. This is because the only resource entering the newly merged block is now "U."

All of the operand pairs in the original $\Phi_c$ instructions are now processed. For each operand pair (R, B), if the block is in the predicated blocks, then that pair is deleted from the $\Phi_c$ and another operand pair is added to the $\Phi_p$ instruction. This new operand pair is "R," paired with the predicate for B from the predicate map. If the $\Phi_c$ has no operand after processing all of its operand pairs, it is deleted.

The topological ordering of the block's $\Phi_c$ is significant in the last loop of the pseudo code. This loop goes through a traversal of the operands of the $\Phi_c$'s and adds the operands in that same order to the $\Phi_p$'s. If the $\Phi_c$'s operands were in topological order, then the $\Phi_p$'s are in an order such that they can be materialized to give correct results.

Figure 6:
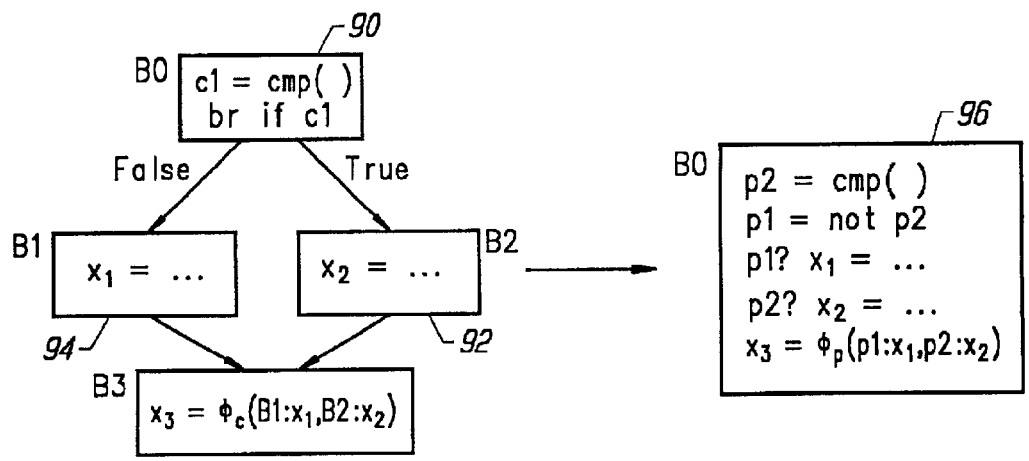
FIG. 6 shows a control flow graph and $\Phi_c$ function according to the invention.
Figure 7:
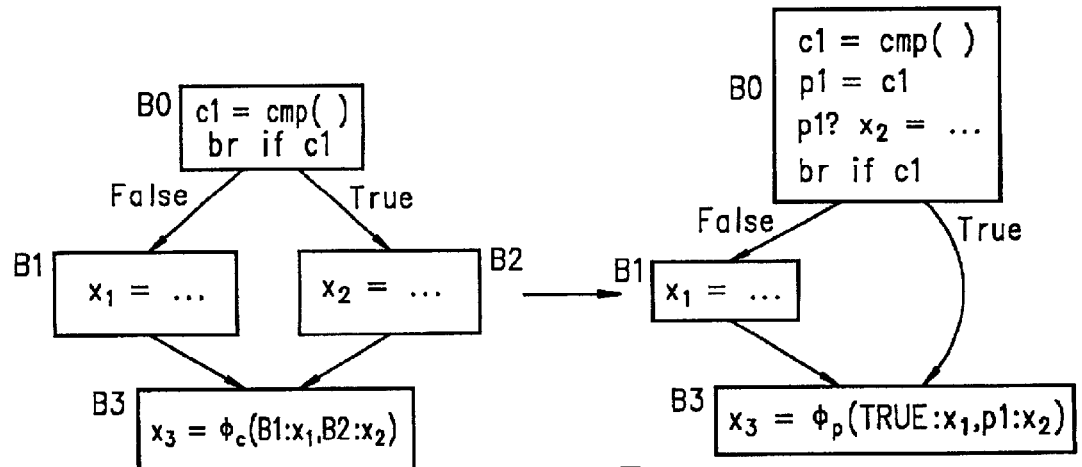
FIG. 7 shows a resulting control flow graph and functions after transformation according to the invention.

FIGS. 6 and 7 show the same control flow graph and $\Phi_c$ function, and the resulting graph and functions after transformation. In FIG. 6., block B0 (designated as 90) contains a compare such that if true the path to the block B2 (designated as 92) is followed and if false the path to block B1 (designated as 94) is followed. p2 gets the result of this compare 96. The definition of $x_1$ is under p1 and the definition $x_2$ is under p2. Because B1 and B2 are topologically equal, their order in the $\Phi_c$ is not important.

In FIG. 7, the assumption is made that B1 is rarely executed and the "TRUE" path is generally followed. Thus, it is not important to predicate the $x_1$ value in block B1 because it is not expected to be executed. It is therefore left as a branch.

Figure 8:
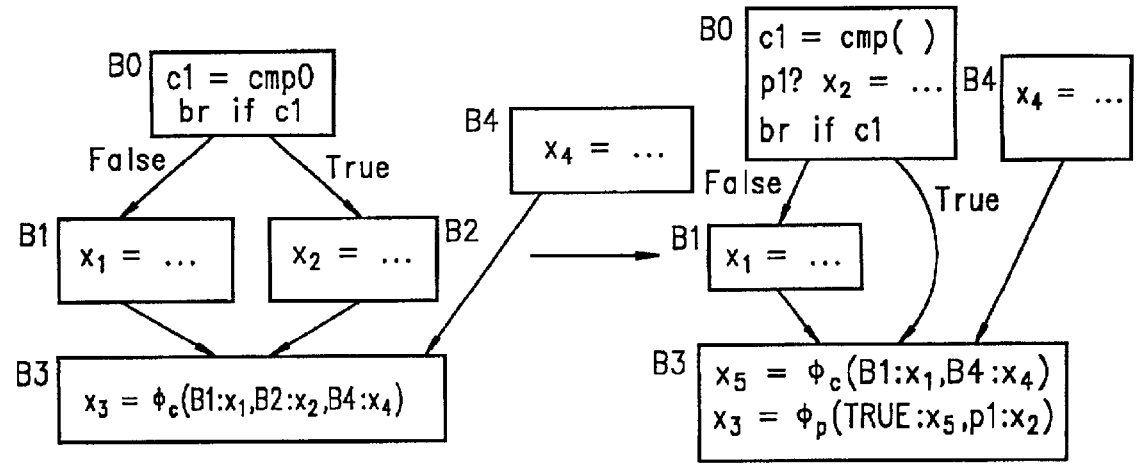
FIG. 8 shows a resulting control flow graph and functions with an additional edge whose source block is not predicated according to the invention.

The example in FIG. 8 is similar to that of FIG. 7, but there is an additional edge (and associated incoming value of x) whose source block is not predicated. In FIG. 8, blocks B1 and B0 have been predicated while block B4 is unaffected by predication. This requires both types of phi at the merge—a $\Phi_c$ to reflect the presence of control join edge and a $\Phi_p$ to reflect the predication.

Although the invention is described herein with reference to the preferred embodiment, one skilled in the art will readily appreciate that other applications may be substituted for those set forth herein without departing from the spirit and scope of the present invention. It is readily apparent that one skilled in the art can provide the source code required to construct the predicate phi instructions of the invention using well-known programming techniques and equipment.

The invention is applicable to any compiler-based computer programming languages for use on different types of computers, including network servers, and desktop computers.

Accordingly, the invention should only be limited by the Claims included below.

What is claimed is:

1. A computer-implemented method for a $\Phi$ function providing a mechanism for single static assignment in the presence of predicated code, the method comprising the steps of:
   introducing an associated ordered predicate guard on each source operand in a predicate $\Phi$ instruction;
   materializing a $\Phi$ function by inserting at least one copy from each source operand to a target variable in the same order as said corresponding one of each said source operand; and
   predicating each of said copies by said ordered predicate guard associated with said source operand.

2. The method of claim 1, further comprising:
   transforming a source code by writing a result of a compare operation on a variable in said source code to a predicate;
   representing said transformed source code in static single assignment form using said $\Phi$ function having source operands;
   materializing said $\Phi$ function; and
   eliminating any unnecessary copies from said source operands.

3. The method of claim 1, further comprising the step of:
   ordering said source operands according to a topological ordering of the source code blocks; and
   maintaining said topological ordering through any subsequent code transformations.

4. The method of claim 3, wherein said topology is determined by a compiler.

5. The method of claim 4, further comprising the steps of:
   the compiler taking a stream of said source code;
   the compiler identifying the blocks and edges of said source code; and
   the compiler topologically numbering said blocks.

6. The method of claim 1, comprising the steps of:
   inserting a predicate $\Phi$ function after each existing predicated assignment.

7. The method of claim 6, wherein said predicate $\Phi$ function is constructed during the initial construction of single static assignment form.

8. The method of claim 6, wherein said predicate guard on said predicate $\Phi$ functions indicates a predicate under which said associated source operand is live.

9. The method of claim 6, wherein said predicate $\Phi$ function is constructed while already in static single assignment form.

10. The method of claim 1, wherein said ordered predicate guards indicate the condition under which an associated source operand is live.

11. The method of claim 1, further comprising:
    introducing an associated ordered control guard on each source operand in a control $\Phi$ instruction; and
    predicating each of said copies by said ordered control guard associated with said source operand.

12. The method of claim 11, further comprising the step of either replacing or augmenting a control $\Phi$ function with a predicate $\Phi$ function.

13. The method of claim 12, wherein said control guard on said $\Phi$ function indicates the basic block which is the source of the edge associated with said source operand.

14. A computer-implemented method for a $\Phi$ function providing a mechanism for single static assignment in the presence of predicated code, the method comprising the steps of:

transforming a source code by writing a result of a compare operation on a variable in said source code to a predicate;

representing said transformed source code in static single assignment from using a predicate Φ function having source operands;

introducing an associated ordered predicate guard on each source operand in a block of said source code;

ordering said source operands according to a topological ordering of the source code blocks;

maintaining said topological ordering through any subsequent code transformations;

materializing said predicate Φ function by inserting at least one copy from each source operand to a target variable in the same order as said source operand; and eliminating any unnecessary copies from said source operands.

15. A system for a Φ function providing a computer-implemented mechanism for single static assignment in the presence of predicated code, comprising:

a transformation module accessible by said computer for transforming a source code by writing a result of a compare operation on a variable in said source code to a predicate;

a single static assignment module accessible by said computer for representing said transformed source code in static single assignment form using a predicate Φ function having source operands;

an ordered guard module accessible by said computer for introducing an associated ordered predicate guard on each source operand in a block of said source code;

a compiler for topologically ordering said blocks of said source code;

an ordering module accessible by said computer for maintaining said topological ordering through any subsequent code transformations;

a materializing module accessible by said computer for materializing said predicate Φ function by inserting at least one copy from each source operand to a target variable in the same order as said source operand; and an eliminating module accessible by said computer for eliminating any unnecessary copies from said source operands.

* * * * *